United States Patent [19]

Barron et al.

[11] Patent Number: 5,525,681
[45] Date of Patent: Jun. 11, 1996

[54] POLYUREA POLYMERS HAVING IMPROVED HIGH TEMPERATURE STABILITY AND METHOD OF MAKING SAME

[75] Inventors: Benny G. Barron; Shenghong Dai; James R. Porter, all of Lake Jackson, Tex.

[73] Assignee: The Dow Chemical Company, Midland, Mich.

[21] Appl. No.: 420,993

[22] Filed: Apr. 13, 1995

Related U.S. Application Data

[63] Continuation-in-part of Ser. No. 979,560, Nov. 20, 1992, abandoned.

[51] Int. Cl.$^6$ .................................................. C08G 18/83
[52] U.S. Cl. ........................ 525/403; 521/156; 525/452; 525/458; 525/528; 528/68; 528/73; 528/481; 528/503
[58] Field of Search .......................... 521/156; 525/452, 525/454, 403, 528; 528/68, 73, 481, 503

[56] References Cited

U.S. PATENT DOCUMENTS

| | | | |
|---|---|---|---|
| 1,436,890 | 3/1984 | Kaufman | 528/73 |
| 3,494,888 | 2/1970 | McElroy | 525/528 |
| 3,639,338 | 2/1972 | Kuder | 528/73 |
| 3,997,490 | 12/1976 | Matsuda et al. | 528/48 |
| 4,129,554 | 12/1978 | Karasawa et al. | 528/67 |
| 4,144,211 | 3/1979 | Chamberlin et al. | 528/403 |
| 4,204,051 | 5/1980 | Wellner et al. | 528/55 |
| 4,218,543 | 8/1980 | Weber et al. | 521/51 |
| 4,225,460 | 9/1980 | Newell | 252/429 |
| 4,237,252 | 12/1980 | Newell | 525/454 |
| 4,272,618 | 6/1981 | Dominguez et al. | 528/67 |
| 4,374,209 | 2/1983 | Rowlands | 521/116 |
| 4,542,165 | 9/1985 | Kumata et al. | 521/137 |
| 4,564,651 | 1/1986 | Markert et al. | 524/589 |
| 4,582,723 | 4/1986 | Markert et al. | 427/116 |
| 4,636,556 | 1/1987 | Ihlein et al. | 528/53 |
| 4,698,408 | 10/1987 | Goel et al. | 528/48 |
| 4,705,838 | 11/1987 | Goel | 528/48 |
| 4,740,539 | 4/1988 | Goel | 528/73 |
| 4,814,103 | 3/1989 | Potter et al. | 252/182.22 |
| 4,847,122 | 7/1989 | Goldberg et al. | 523/455 |
| 4,906,772 | 3/1990 | Edlin et al. | 528/49 |
| 5,079,326 | 1/1992 | Suzuki et al. | 528/53 |
| 5,106,943 | 4/1992 | Yoshimatsu | 528/45 |
| 5,162,387 | 11/1992 | Abel et al. | 528/73 |
| 5,173,559 | 12/1992 | Müller et al. | 528/44 |

FOREIGN PATENT DOCUMENTS

| | | | |
|---|---|---|---|
| 0294013A2 | 7/1988 | European Pat. Off. | C09D 3/58 |
| 0421393A2 | 10/1991 | European Pat. Off. | C08G 18/32 |
| 2446438 | 4/1985 | Germany . | |
| 1319795 | 6/1973 | United Kingdom . | |

OTHER PUBLICATIONS

International Search Report dated 18 Feb. 1994 issued by the EPO acting as the International Searching Authority in PCT/US 93/10262.
F. M. Sweeney; Intro, to RIM; 1979; p. 69.
Encyclopedia Polymer Sci. & Eng:; vol. 13; 1988; Polyurethanes; pp. 280-281.

*Primary Examiner*—Rachel Johnson

[57] ABSTRACT

Polyurea polymers prepared from formulations including a polyisocyanate, a polyamine and a polyepoxide can have good heat stability and good physical properties in the substantial absence of uretidine diones and isocyanurates. The polymers can be prepared in one step of admixing and heating at greater than 150° C. or in a two step process by first admixing the components at less than 130° C. and then postcuring the product at greater than 150° C. The polyurea polymer, after postcuring, can have substantially no residual epoxy or oxazolidinone groups. These polymers were particularly useful for applications which require the exposure of the polyurea polymers to both intermittent high temperatures and high humidity. The polyurea polymers of the present invention can withstand higher temperatures than conventional polyurea polymers without blistering.

19 Claims, No Drawings

POLYUREA POLYMERS HAVING IMPROVED HIGH TEMPERATURE STABILITY AND METHOD OF MAKING SAME

CROSS-REFERENCE TO RELATED APPLICATION

This application is a Continuation In Part of U.S. Ser. No. 07/979,560, filed Nov. 20, 1992, entitled POLYUREA POLYMERS HAVING IMPROVED HIGH TEMPERATURE STABILITY AND METHOD OF MAKING SAME, which is now abandoned.

BACKGROUND OF THE INVENTION

This invention relates to polyurea polymers and polyurea polymer formulations.

It is known in the art to prepare isocyanate based polymers useful for small molding applications such as molded shoe soles. It is also known in the art to prepare such polymers, particularly polyurea polymers, useful for preparing larger moldings such as automobile fascia and body panels. For example, U.S. Pat. No. 4,218,543 to Weber, et al. discloses preparing elastomeric moldings by a reaction injection molding (RIM) process.

However, using polyurea polymers is not always trouble free. Particularly when the polyurea polymers are filled polymers and are first exposed to humid environments and then exposed to high temperatures, surface defects can be observed. In one common polyurea application, reaction injection molding of automobile body parts, the polyurea part can be exposed to temperatures exceeding 350° F. (177° C.). Polyurea parts containing too much water, when exposed to such high temperatures, can exhibit surface phenomena commonly known in the art as blistering.

Blistering occurs when moisture absorbed into a polyurea part interacts with the polymer to produce gas which accumulates in the part forming a gas pocket. This defect, if severe, can cause an entire part to be rejected resulting in lost raw materials, lost production, increased waste and scrap and, as a result, economic loss to the part producer or to the end-user of the part, or both.

The obvious solutions to the blistering problem, avoiding exposing the polyurea polymer parts to high temperatures, or avoiding exposing the polyurea polymer parts to humid air are not always desirable. Heat curing can impart desirable properties to polyurea parts. Applying heat can also aid in the curing of paint finishes, thereby reducing production time and allowing for increased production rates. Also, as in an automobile production application, a polyurea part may be required to be attached to another article and that article may require a high heat exposure. Controlling the humidity in every phase of polyurea part production could be expensive. Therefore, it would be desirable to prepare polyurea polymers which are stable, that is, do not blister upon exposure to humid air and then elevated temperatures.

SUMMARY OF THE INVENTION

In one aspect, the present invention is a method for preparing a polyurea polymer comprising admixing a polyisocyanate, a polyepoxide, and a polyamine and heating the admixture at a temperature of greater than 150° C.

In another aspect, the present invention is a polyurea polymer comprising the product of admixing a polyisocyanate, a polyepoxide and a polyamine at a temperature of greater than 150° C.

In yet another aspect, the present invention is a polyurea polymer formulation comprising a polyisocyanate, a polyamine and a polyepoxide.

Another aspect of the present invention is a composition of matter comprising a crosslinked polyurea polymer having the general formula:

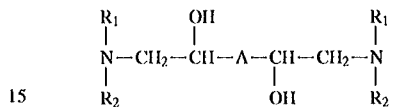

wherein A is a linking group defined as one or more atoms covalently linking the two adjacent groups, $R_1$ is a polyurea having adducts of an organic polyisocyanate and a polyamine, and $R_2$ is $-C(O)-NH-R_1$.

The polymers of the present invention can be used in applications wherein a high postcuring temperature is required. High temperature stability is obtained with the present invention in the substantial absence of crosslinking materials known as uretidine diones (dimers) and isocyanurates (trimers). The polymers of the present invention are particularly useful in applications which require both an intermittent high temperature exposure and a polymer free from surface defects. The polymers of the present invention can withstand intermittent higher temperatures without blistering and yet have selected physical properties comparable or even superior to conventional polyurea polymers.

Surprisingly, suitable polymers for use in applications that require a high postcuring temperature are obtained in the absence of uretidine dione groups (dimers) or isocyanurate groups (trimers). This is surprising because dimers and trimers are generally known to impart high temperature stability and tensile strength to polymers which incorporate them. In U.S. Pat. No. 3,494,888 to McElroy, dimers and trimers are purposely incorporated to produce highly cross-linked heat stable thermoset plastics. However, eliminating dimers and trimers is advantageous in some applications because they impart brittleness to polymer parts. The ability to eliminate the brittleness caused by the dimers and trimers is a particularly important feature in applications in which brittleness is not desireable, such as in automobile body panels. Further, incorporating dimers and trimers adds cost to the process because additional catalyst is required, and additional expensive isocyanate raw materials are consumed in order to produce them.

DESCRIPTION OF THE PREFERRED EMBODIMENTS

The present invention is a polymer which can be prepared in a single step of admixing a polyisocyanate, a polyamine and a polyepoxy and heating the admixture at a temperature of greater than 150° C. However, preferably, the polyureas of the present invention are prepared in two steps. In a first step, three components are admixed under reaction conditions sufficient to prepare a polyurea polymer, but at a temperature of less than 130° C. In a second step, the polymer is postcured at a temperature of greater than 150° C.

The three components admixed to form the polymers of the present invention are a polyisocyanate, a polyepoxide and a polyamine. These components can be admixed in any way known to those skilled in preparing polyurea polymers to be useful. For example, the components can be admixed and poured into an open mold, a process known as casting. One useful embodiment of the present invention is a cellular polyurea polymer foam prepared by admixing the polyisocyanate, polyamine and polyepoxide in the presence of a blowing agent and injecting the forming polymer into a mold forming a molded foam. This can be done using a foam machine which normally consists of a low pressure metering unit and a mechanical mixer. In another embodiment, the forming polyurea can be sprayed onto a substrate.

One preferred group of embodiments of the present invention are polyurea polymers prepared by RIM. This process is well known in the art of preparing polyurea polymers. However, generally, a RIM process relates to a process whereby two or more highly reactive streams are brought together under high pressure in a small mixing chamber. The material mixes and flows immediately into a warm mold where the chemical reaction is completed sufficiently to allow removal of the part from the mold. The streams are, in the case of the present invention, a polyisocyanate and polyepoxide stream designated the "A" stream and one or more streams containing isocyanate reactive materials and additives designated collectively as the "B" component or stream. In closed mold RIM, the mold is composed such that the forming polymer, upon entering the mold, pushes the air from the mold resulting in a polymer substantially free of trapped air. RIM can also be performed in an open mold process. The formed polyurethane polymer part is removed from the mold and postcured.

The polyurea polymers of the present invention are prepared by admixing a polyisocyanate and a polyamine (and a polyepoxide). Care should be exercised in choosing the polyisocyanate and polyamine components of the present invention. Primary amines and aromatic polyisocyanates are particularly mutually reactive. Forming polymers from such components can be very difficult because the reaction can be rapid and very exothermic, thereby preventing the formation of a homogeneous polymer. Therefore, one should choose polyisocyanate and polyamine components which have a mutual reactivity suitable for preparing the desired polyurea polymer.

The polyisocyanate component of the present invention can be advantageously selected from organic polyisocyanates, modified polyisocyanates, isocyanate-based prepolymers, and mixtures thereof. These can include aliphatic and cycloaliphatic isocyanates, but multifunctional and particularly difunctional aromatic isocyanates are preferred. Preferred are 2,4- and 2,6-toluenediisocyanate (TDI) and the corresponding isomeric mixtures; 4,4'-, 2,4'- and 2,2'-diiphenylmethanediisocyanate (MDI) and the corresponding isomeric mixtures; mixtures of 4,4'-, 2,4'- and 2,2'-MDI and polyphenyl polymethyleneä polyisocyanates (PMDI); and mixtures of PMDI and TDI.

Also useful for preparing the polyureas of the present invention are aliphatic and cycloaliphatic isocyanate compounds such as 1,6-hexamethylenediisocyanate; 1-isocyanato-3,5,5-trimethyl-1- 3-isocyanatomethyl-cyclohexane; 2,4- and 2,6-hexahydrotoluenediisocyanate. The corresponding isomeric mixtures; 4,4'-, 2,2'- and 2,4'-dicyclohexylmethanediisocyanate, as well as the corresponding isomeric mixtures can also be used. Isophorone diisocyanate can also be used with the present invention.

Also advantageously used for the polyisocyanate component are the so-called modified multifunctional isocyanates, that is, products which are obtained through chemical reactions of the above polyisocyanates. Exemplary are polyisocyanates containing esters, ureas, biurets, allophanates and carbodiimides and/or uretonimines; urethane group containing diisocyanates or polyisocyanates. Polyisocyanates containing carbodiimide groups and/or uretonimine groups having an isocyanate group (NCO) content of from 10 to 40 weight percent, more preferably from 20 to 35 weight percent, can also be used. These include, for example, polyisocyanates based on 4,4'-, 2,4'- and/or 2,2'-MDI and the corresponding isomeric mixtures, 2,4- and/or 2,6-TDI and the corresponding isomeric mixtures; mixtures of MDI and PMDI and mixtures of TDI and PMDI and/or diphenylmethane diisocyanates.

Suitable and preferred are prepolymers having an NCO content of from 5 to 40 weight percent, more preferably from 15 to 30 weight percent. These prepolymers are prepared by reaction of the polyisocyanates with materials including lower molecular weight diols, triols, but also they can be prepared with multivalent active hydrogen compounds such as di- and tri-amines and di- and tri-thiols. Individual examples are aromatic polyisocyanates containing urethane groups, preferably having an NCO content of from 5 to 40 weight percent, more preferably 10 to 35 weight percent, obtained by reaction of polyisocyanates with, for example, lower molecular weight diols, triols, oxyalkylene glycols, dioxyalkylene glycols or polyoxyalkylene glycols having molecular weights up to 800. These polyols can be employed individually or in mixtures as di- and/or polyoxyalkylene glycols. For example, diethylene glycols, dipropylene glycols, polyoxyethylene glycols, polyoxypropylene glycols and polyoxypropylenepolyoxyethylene glycols can be used.

Even more preferred for use in the present invention are: (i) polyisocyanates having an NCO content of from 8 to 40 weight percent containing carbodiimide groups and/or urethane groups, from 4,4'-MDI or a mixture of 4,4'- and 2,4'-MDI; (ii) prepolymers containing NCO groups, having an NCO content of from 10 to 35 weight percent, based on the weight of the prepolymer, prepared by the reaction of polyoxy-alkylene polyols, having a functionality of preferably from 2 to 4 and a molecular weight of from 800 to 15,000 with 4,4'-diphenylmethane diisocyanate or with a mixture of 4,4'- and 2,4'-MDI and mixtures of (i) and (ii); and (iii) 2,4- and 2,6-TDI and the corresponding isomeric mixtures.

PMDI in any of its forms can also be used to prepare the polyureas of the present invention. In this case it preferably has an equivalent weight between 125 and 300, more preferably from 130 to 240, and an average functionality of greater than 2. More preferred is an average functionality of from 2.5 to 3.5. The viscosity of the polyisocyanate component is preferably from 25 (0.025 Pa.s) to 5,000 (5 Pa.s) centipoise, but values from 100 (0.100 Pa.s) to 2,000 (2 Pa.s) centipoise at 25° C. are preferred for ease of processing. Similar viscosities are preferred where alternative polyisocyanate components are selected.

The polyamine component of the present invention can be any polyamine or mixture of polyamines which can be used to prepare a polyurea. The polyamines are amine compounds having two or more isocyanate reactive hydrogens per molecule. Preferably, all of isocyanate reactive hydrogens of the polyamine are amine group hydrogens. Examples of such polyamines include alkylene polyamines represented by the formula:

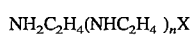

where X is —OH or —NH₂ and where n has the value of 0 to 5. When X is —NH₂, such alkylene polyamines include ethylene diamine, diethylene triamine, triethylene tetramine, tetraethylene pentamine, pentaethylene hexamine, and the like.

Aromatic amines can be used with the present invention as well. Examples of aromatic polyamines include 2,4 and 2,6-toluenediamine, n-aminoethylpiperazine, m-phenylenediamine. Particularly useful with the present invention are diethyltoluenediamine and di-tert-butyl-toluenediamine, and the like.

A particularly useful group of amines are amines derived from polyoxypropylene diols and triols. Preferably these diamines have the formula:

wherein x is an integer of from 2 to 40, and the triamines have the formula:

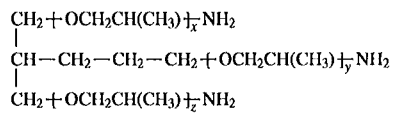

wherein x, y and z represent integers in the range of from 1 to 15, and the sum of x, y and z is from 3 to 50. The most preferred polyoxypropylene diamines have an average molecular weight of from 230 to 2,000. The most preferred polyoxypropylene triamines have an average molecular weight of from 190 to 5,000. Also useful are diamines having the formula:

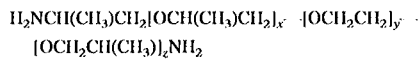

wherein x+z equals 2 to 10 and y is an integer from 1 to 50.

Suitable epoxy resins which can be employed in the preparation of the polyureas of the present invention include, for example, the diglycidyl ethers of compounds containing an average of more than two, preferably not greater than 2 aromatic, cycloaliphatic or aliphatic hydroxyl groups per molecule. Particularly suitable such epoxy resins can be represented by the following formulas:

Formula I (Diglycidyl Ethers of Cycloaliphatic Single Ring Compounds)

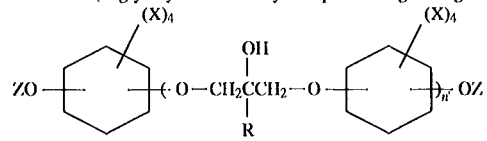

Formula II (Diglycidyl Ethers of Cycloaliphatic Two Ring Compounds)

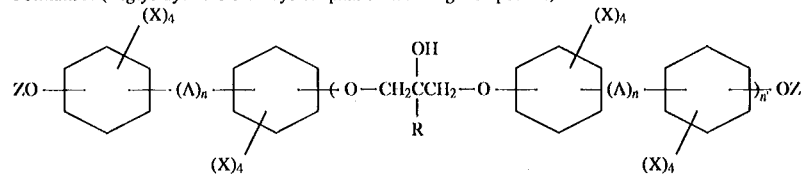

Formula III (Diglycidyl Ethers of Dihydric Single Ring Compounds)

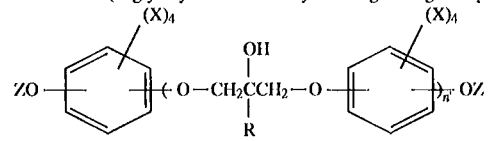

Formula IV (Diglycidyl Ethers of Dihydric Bisphenols)

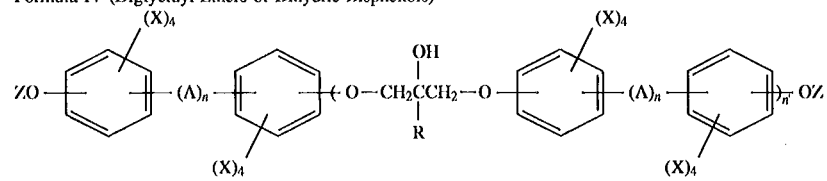

Formula V (Polyglycidyl ethers of Hydrocarbon Phenolic Resins)

-continued

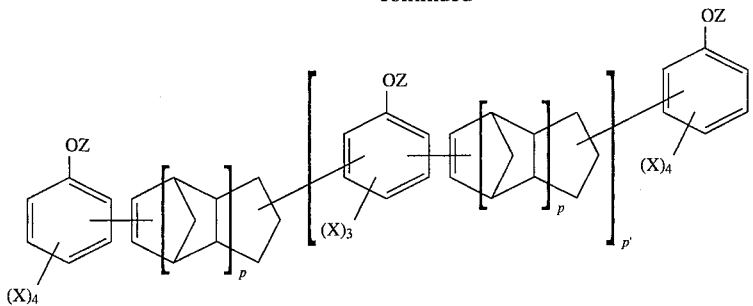

Formula VI (Polyglycidyl ethers of Polyoxyalkylene Glycols or Aliphatic Diols)
ZO—Z"—OZ Formula VII (Polyglycidyl Ethers of Novolac Resins)

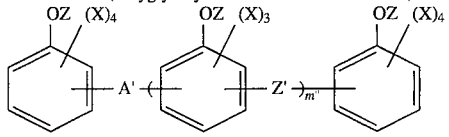

wherein each A is independently a divalent hydrocarbyl group having from 1 to 18, preferably from 1 to 8, more preferably from 1 to 6 carbon atoms, —O—, —S—, —S—S—, —SO$_2$— or —CO—; A' is a —CH$_2$—; each R is independently hydrogen, methyl or ethyl; each X is independently hydrogen or a lower alkyl group having from 1 to 4, preferably from 1 to 2, carbon atoms, or a halogen, preferably chlorine or bromine; Z is a glycidyl group represented by the following formula:

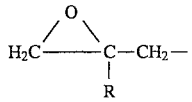

Z" is a divalent aliphatic moiety; m" has an average value from 0.01 to 10, preferably from 0.01 to 5, more preferably from 0.01 to 3; n has a value of zero, 1 or 2; n' has an average value from 0 to 60, preferably from 10 to 50, more preferably from 20 to 40; p has an average value from zero to 6, preferably from 0 to 4, more preferably from 0 to 2; and p' has an average value from 0 to 20, preferably from 0 to 10, more preferably from 0 to 5.

The term "hydrocarbyl" employed herein means an aromatic, aliphatic, cycloaliphatic group, or groups having both aromatic and aliphatic character, having from 1 to 18, preferably from 1 to 8, more preferably from 1 to 4 carbon atoms. The aliphatic and cycloaliphatic groups can be saturated or unsaturated. These hydrocarbyl groups are monovalent or divalent as required.

Included in the above are glycidyl ethers of aliphatic polyols. Also included are glycidyl amines such as the tetragylcidyl amine of methylene dianiline. Epoxided compounds such as epoxided aminophenol and epoxided polyolefins can also be used with the present invention.

While any polyepoxide can be used with the present invention, desirably the polyepoxide is a diglycidyl ether of dihydric bisphenol. Also desirably the polyepoxide has little or no hydroxyl functionality, a viscosity of less than 100,000 cps at 25° C. (100 Pa.s), and is compatible with the organic polyisocyanate of the polyurea formulation in which it is intended to be included.

The three components of the formulations of the present invention, a polyisocyanate, a polyamine and a polyepoxide are admixed under reaction conditions sufficient to prepare a polyurea. It is known that amines and isocyanates are often very reactive with each other, and that the amine/isocyanate reaction is much faster than an uncatalyzed reaction of either an amine or an isocyanate and an epoxide. It is also known that in preparing the polymers of the present invention by the two step method, the polyepoxide remains substantially unreacted during the first step and primarily reacts during the second step curing. This is demonstrated by analysis of polyurea polymers of the present invention wherein the polyurea polymers are prepared in two steps, a first step of admixing the reactants at less than 130° C., and a second step of postcuring the polymer at greater than 150° C. The polyamine formulation had a ratio of 1 epoxide group per 5 amine groups. Analysis of the polyurea polymer by fourier transform infrared spectroscopy (FTIR) after the first method step fails to reveal oxazolidinone groups. Analysis of the polyurea polymer by FTIR after the second step reveals only insignificant amounts of oxazolidinone groups. Epoxy groups are detected in the polyurea polymer by FTIR after the first step, but epoxy groups are not detected in this polymer by FTIR after the second step postcuring.

While the Applicants do not wish to be bound by any theory, Applicants believe that at the second step cure temperatures disclosed above, the polyepoxides react with the polyurea groups of the polyurea polymers. Such a reaction forms a crosslink between polyurea molecules thereby forming a crosslinked polyurea having the general formula:

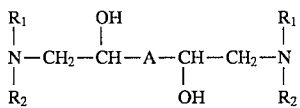

wherein A is a linking group defined as one or more atoms covalently linking the two adjacent groups, $R_1$ is a polyurea having adducts of an organic polyisocyanate and a polyamine, and $R_2$ is —C(O)—NH—$R_1$.

The polyurea polymers of the present invention can have multiple polyepoxide crosslinking as well as having only a single crosslink. The extent of crosslinking will be a function of amount of polyepoxide in the polyurea formulation and the step 2 cure conditions. The greater the ratio of epoxide groups to amine groups in the formulation and the more complete the postcure, the greater the likelihood that there will be multiple crosslinking in the polymers of the present invention.

The primary linking groups of the present invention are believed to be the remainder of the polyepoxide molecules of the formulations of the present invention after the epoxide groups form covalent bonds with the urea nitrogens of the polyureas. The linking groups can also be autopolymerized polyepoxides with the terminal epoxide groups reacting with the urea nitrogens to form the crosslinking groups of the present invention, polyurethane linkages between polyisocyanates and the hydroxyl groups resulting from the autopolymerization of the polyepoxides and epoxide amine reaction products. Additionally, the polyureas can also have urethane groups and linkages from either selection of polyurethane modified polyisocyanates for the polyurea formulation, or from including base polyols or other active hydrogen containing materials in the polyurea formulation.

The properties of the polymers of the present invention can be markedly superior in certain applications to both conventional polyureas and to oxazolidinone polymers. Therefore, the polymers of the present invention are preferably prepared in the substantial absence of any oxazolidinone catalysts. Wherein there are oxazolidinone catalysts present, they are present in amounts such that the predominant polyepoxide reaction is that to form the covalent bond with the urea nitrogens of the polyurea as described above. Accordingly, the polyurea polymers of the present invention are preferably prepared from formulations excluding effective concentrations of the known classes of compounds which are oxazolidinone catalysts, including tertiary amines, quaternary ammonium salts, phosphonium salts, alkali halides, imidizoles; and aluminum, calcium, iron, magnesium or zinc based lewis acids.

In one embodiment of the present invention, the polyureas are postcured. This postcure is done at conditions sufficient to cause the epoxy groups of the polyepoxides to react within the polyurea such that the desirable properties of the present invention are observed. The length of the postcure will vary with the reactivity of the polyepoxide chosen for the polyurea formulation, the postcure temperature and the desired extent of the postcure. Therefore an exact specification of postcure time and temperature is not possible. However, for example, where maximum improvement in physical properties is desired, and the polymers of the present invention are to be postcured for 30 minutes, the postcure can be performed at from 150° C. to 250° C., preferably from 165° C. to 220° C. and more preferably from 175° C. to 210° C.

Analysis of the postcured polymer by FTIR spectroscopy can desirably show the presence of no or very little epoxy or oxazolidinone groups. However, insufficient postcuring or use of high ratios of epoxide groups to amine groups in the formulation of the polymers of the present invention can result in polymers having residual unreacted epoxy groups. Inclusion of oxazolidinone catalysts can also cause the presence of oxazolidinone groups by catalyzing the competing oxazolidinone reaction.

The polyureas of the present invention can display better heat stability, as evidenced by resistance to blistering, than conventional polyureas. For example, a conventional RIM polyurea which has been exposed to moisture can severely blister upon exposure to temperatures of 185° C. Similar polymers of the present invention, exposed to similar amounts of moisture, can endure temperatures of greater than (400° F.) 205° C. without blistering.

The polyurea polymers of the present invention can also display superior physical properties compared to conventional polyureas. For example, the RIM polyurea polymers of the present invention can have lower heat sag, higher modulus, higher heat distortion temperatures and less blistering than conventional RIM polyurea polymers.

The polyurea polymers of the present invention are formulated very similarly to conventional polyurea polymers regarding the polyisocyanate and polyamine components. For example, the molar ratio of isocyanate groups to amine groups in the formulations of the present invention can be from 0.80 to 1.20, preferably from 0.90 to 1.10 and even more preferably from 0.95 to 1.05. Those skilled in the art of preparing polyurea polymers well know how to balance the ratio of isocyanate groups to amine groups to form polymers having desired properties. Additionally, preparing such polyurea polymer formulations is well documented.

The balancing of the polyepoxide component in the formulation of the present invention is done in a similar manner to the balancing of the polyamine and polyisocyanate components. Optimum improvement to physical properties of polyurea polymers is observed when the ratio of epoxide groups to amine groups is from 0.05 to 1.50, preferably from 0.10 to 1.00, and even more preferably from 0.15 to 0.50. In weight percentages, the polyepoxide component is preferably from 5 percent to 50 percent, more preferably from 5 to 35 percent, and even more preferably from 5 to 20 percent by weight of the polyurea polymer formulation when the polyepoxide is, for example, a diglycidyl ether of bisphenol.

The polyurea polymers of the present invention can be prepared with additives and other formulation components to prepare polymers with desired properties. For example, when a foamed polymer is desired, the polyurea polymers can be prepared from a formulation including one or more blowing agents such as water, carbon dioxide, and air.

The polyurea polymers of the present invention can be prepared with fillers. For example, RIM polyurea polymers can be prepared with fillers such as mica, clays, glass fibers, glass beads, glass microspheres, and wollastonite. Any filler known to those skilled in the art of preparing polyurea polymers can be used with the present invention. The polymers of the present invention can also be prepared with reinforcing substrates. For example the polymers of the present invention can be prepared with reinforcing mats.

In some applications, it is desirable to include as additives materials such as mold release agents, surfactants, ultraviolet light stabilizers, molecular weight extenders, pigments, fire retardants in the formulations of the present invention. These materials are all well known in the art. Any additive known to those skilled in the art to be useful in preparing polyurea polymers, can be included in the formulations of the polyurea formulations of the present invention.

This invention can also be used to prepare polymers from formulations having other isocyanate reactive hydrogen containing compounds besides polyamines. For example, the polymers of the present invention can be prepared from formulations including polyether or polyester polyols. The resultant polyurea/polyurethane polymers can also have improved physical properties compared to otherwise similar conventional polyurea/polyurethane polymers. Active hydrogen containing compounds most commonly used in polyurethane production are those compounds having at least two hydroxyl groups. Those compounds are referred to herein as polyols.

Representative polyols suitable for use in the present invention are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II, pp. 5–6,198–199 (1964); *Organic Polymer Chemistry* by K. J. Saunders, Chapman and Hall, London, pp. 323–325 (1973); and *Developments in Polyurethanes,* Vol. I, J. M. Burst, ed., Applied Science Publishers, pp. 1–76 (1978). However, any active hydrogen containing compound can be used with the method of this invention. Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, and mannitol. Preferred herein as alkylene oxide adducts of polyhydroxyalkanes are the ethylene oxide adducts of trihydroxyalkanes. Other useful adducts include ethylene diamine, glycerin, ammonia, 1,2,3,4-tetrahydroxy butane, fructose, and sucrose.

Also preferred are poly(oxypropylene) glycols, triols, tetrols and hexols and any of these that are capped with ethylene oxide. These polyols also include poly(oxypropyleneoxyethylene)polyols. The oxyethylene content should preferably comprise less than 80 weight percent of the total and more preferably less than 40 weight percent. The ethylene oxide, when used, can be incorporated in any way along the polymer chain, for example, as internal blocks, terminal blocks, or randomly distributed blocks, or any combination thereof.

Polyisocyanate polyaddition active hydrogen containing compounds (PIPA) can be used with the present invention. PIPA compounds are typically the reaction products of TDI and triethanolamine. A method for preparing PIPA compounds can be found in, for example, U.S. Pat. No. 4,374,209, issued to Rowlands.

Another class of polyols which can be used with the formulations of the present invention are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyronitrile; copolymer polyol stabilizers; and chain transfer agents such as isopropanol.

In addition to the base polyols described above, other active hydrogen containing materials are useful with the formulations of the present invention. Low molecular weight polyfunctional compounds such as glycols, glycerols, di- and tri-amino compounds, and polyfunctional amino-alcohols can be included in the formulations of the present invention and are particularly useful. For example, ethylene glycol and or diethyltoluenediamine can be used as chain extenders.

When additional isocyanate reactive materials such as the polyols described hereinabove are included in polyurea formulations, they must be included in the calculation of ratio of isocyanate groups to isocyanate reactive groups. However, for the purposes of the present invention, these materials are not included in the calculation of polyepoxide to polyamine ratio or in the polyepoxide percent weight calculation. Both the polyol and the additional isocyanate required to react with the polyol are ignored in the calculations.

The following examples and comparative examples are for illustrative purposes only. They are not meant to be and neither should they be interpreted as limitations of the scope of the invention.

EXAMPLE 1

A polyurea polymer was prepared by admixing an "A" (polyisocyanate and polyepoxy) component with a "B" (polyamine) component by means of a RIM machine. The formulation was detailed in Table 1 but includes 5 percent polyepoxy. The polyurea polymer thus formed was postcured at 190° C. for 30 minutes. After postcuring, the parts were analyzed for physical properties. The results of the physical property analysis were displayed in Table 2. The RIM machine was a duel reservoir MRH-30* operating conditions for which are disclosed in Table 3 (*MRH-30 was a trade designation of Hi-Tech Engineering, Inc.).

EXAMPLE 2

A polyurea polymer was prepared and tested substantially identically to Example 1 except that the formulation includes 10 percent polyepoxide. The results of the physical property analysis are displayed in Table 2.

EXAMPLE 3

A polyurea polymer was prepared and tested substantially identically to Example 1 except that the formulation includes 14 percent polyepoxide. The results of the physical property analysis are displayed in Table 2.

EXAMPLE 4

A polyurea polymer was prepared and tested substantially identically to Example 1 except that the formulation includes 18 percent polyepoxide. The results of the physical property analysis are displayed in Table 2.

COMPARATIVE EXAMPLE 5

A polyurea polymer was prepared and tested substantially identically to Example 1 except that the formulation includes no polyepoxide. The results of the physical property analysis are displayed in Table 2.

COMPARATIVE EXAMPLE 6

A polyurea polymer was prepared and tested substantially identically to Example 1 except that the formulation includes 2.7 percent polyepoxide. The results of the physical property analysis are displayed in Table 2.

TABLE 1

|  | EXAMPLE 1 | EXAMPLE 2 | EXAMPLE 3 | EXAMPLE 4 | *COMP. EXAMPLE 5 | *COMP. EXAMPLE 6 |
|---|---|---|---|---|---|---|
| POLY-ISOCYANATE[1] | 167 parts | 167 parts | 167 parts | 167 parts | 167 parts | 167 parts |
| POLY-EPOXIDE[2] | 17 parts (5%) | 37 parts (10%) | 53 parts (14%) | 71 parts (18%) | 0 parts (0%) | 9 parts (3%) |
| POLY-AMINE I[3] | 50 parts | 50 parts | 50 parts | 50 parts | 50 parts | 50 parts |
| POLY-AMINE II[4] | 50 parts | 50 parts | 50 parts | 50 parts | 50 parts | 50 parts |
| POLY-AMINE III[5] | 50 parts | 50 parts | 50 parts | 50 parts | 50 parts | 50 parts |
| A/B ratio[6] | 1.22 | 1.35 | 1.47 | 1.59 | 1.11 | 1.17 |

*Not an example of the present invention.
[1] An MDI polyurethane prepolymer having an isocyanate equivalent weight of about 241.
[2] A diglycidyl ether of bisphenol A having a molecular weight of about 340 and difunctionality.
[3] A polyamine having an approximate equivalent weight of about 1000 and trifunctionality.
[4] A polyamine having an approximate equivalent weight of about 1000 and having difunctionality.
[5] Diethyltoluenediamine.
[6] Weight ratio of organic polyisocyanate and polyepoxide to polyamine components.

TABLE 2

|  | EXAMPLE 1 | EXAMPLE 2 | EXAMPLE 3 | EXAMPLE 4 | *COMP. EXAMPLE 5 | *COMP. EXAMPLE 6 |
|---|---|---|---|---|---|---|
| POLY-EPOXIDE | 5 percent | 10 percent | 14 percent | 18 percent | 0 percent | 3 percent |
| specific gravity g/cc[1] | 1.11 | 1.11 | 1.11 | 1.11 | 1.11 | 1.11 |
| Flex-Mod.[2] psi/mPa | 75,000/ 517,106 | 80,000/ 551,580 | 87,900/ 606,049 | 96,500/ 665,344 | 71,000/ 489,528 | 74,000/ 510,212 |
| Heat deflection Temp.[3] °F. (°C.) | 380 (193) | 384 (196) | 391 (199) | 390 (199) | 378 (192) | 379 (193) |
| Tensile psi/mPa[4] | 3,300/ | 3,500/ | 3,700/ | 3,900/ | 3,400/ | 3,400/ |
| Blister Test[5] | PASS | PASS | PASS | PASS | FAIL | FAIL |

*Not an example of the present invention.
[1] ASTM D 792-91 Standard Test Methods for Density and Specific Gravity (Relative Density) of Plastics By Displacement.
[2] ASTM D 790-91 Standard Test Methods for Flexural Properties of Unreinforced and Reinforced Plastics and Electrical Insulating Materials.
[3] ASTM D 648-82 (Reapproved 1988) Standard Test Method for Deflection Temperature of Plastics Under Flexural Load
[4] ASTM D 638-91 Standard Test Method for Tensile Properties of Plastics.
[5] Samples are submerged in ambient temperature water for 10 days, removed from the water and towel dried, and then exposed to 400° F. (205° C.) in an oven for about one hour. A sample which shows any visible blistering fails this test. Samples showing no blisters pass.

TABLE 3

| MOLD TEMPERATURE | 82° C. |
|---|---|
| INJECTION PRESSURE | 2,000 psi/13,780 mPa |
| RESERVOIR A TEMPERATURE | 40° C. |
| RESERVOIR B TEMPERATURE | 40° C. |

EXAMPLE 7

A polyurea/polyurethane polymer was prepared and tested substantially identically to Example 1 except the formulation detailed in Table 4 was used. Physical testing results are listed in Table 5.

COMPARATIVE EXAMPLE 8

A polyurea/polyurethane polymer was prepared and tested substantially identically to Example 7 except the formulation includes no polyepoxide. Physical testing results are listed in Table 5.

TABLE 4

|  | EXAMPLE 7 | COMPARATIVE EXAMPLE 8* |
|---|---|---|
| POLYISOCYANATE[1] | 190 parts | 190 parts |
| POLYAMINE I[2] | 60 parts | 60 parts |
| POLYAMINE 2[3] | 25 parts | 25 parts |
| POLYEPOXIDE[4] | 42 parts | 0 parts |
| POLYOL[5] | 75 parts | 75 parts |
| SURFACTANT[6] | 0.5 parts | 0.5 parts |
| MOLD RELEASE AGENT[7] | 2.5 parts | 2.5 parts |
| A/B RATIO[8] | 1.42 | 1.17 |

*Not an example of the present invention.

TABLE 4-continued

|  | EXAMPLE 7 | COMPARATIVE EXAMPLE 8* |
|---|---|---|

[1] An MDI polyurethane prepolymer having an isocyanate equivalent weight of about 241.
[2] Diethyltoluenediamine.
[3] A polyamine having an approximate equivalent weight of about 1,000 an having difunctionality.
[4] A diglycidyl ether of bisphenol A having a molecular weight of about 340 and difunctionality.
[5] A 5,000 molecular weight ethylene oxide capped polypropylene oxide polyether triol.
[6] A silicon surfactant.
[7] Zinc stearate.
[8] Weight ratio of organic polyisocyanate and polyepoxide to polyamine components.

TABLE 5

|  | EXAMPLE 7 | COMPARATIVE EXAMPLE 8* |
|---|---|---|
| POLYEPOXIDE CONTENT | 11 percent | 0 percent |
| Specific Gravity g/cc[1] | 1.11 | 1.11 |
| Flex Modulus[2] psi/mPa | 78,500/540,865 | 73,900/509,171 |
| Heat Deflection Temperature[3] °F. (°C.) | 393 (200) | 372 (189) |
| Tensile[4] psi (mPa) | 4,910 (33,829) | 3,840 (26,458) |
| Blister Test[5] | PASS | FAIL |

*Not an example of the present invention.
[1] ASTM D 792-91 Standard Test Methods for Density and Specific Gravity (Relative Density) of Plastics By Displacement.
[2] ASTM D 790-91 Standard Test Methods for Flexural Properties of Unreinforced and Reinforced Plastics and Electrical Insulating Materials.
[3] ASTM D 648-82 (Reapproved 1988) Standard Test Method for Deflection Temperature of Plastics Under Flexural Load.
[4] ASTM D 638-91 Standard Test Method for Tensile Properties of Plastics.
[5] Samples were submerged in ambient temperature water for 10 days, removed from the water and towel dried, and then exposed to 400° F. (205° C.) in an oven for about one hour. A sample which shows any visible blistering fails this test. Samples showing no blisters pass.

EXAMPLE 9

A polyurea polymer was prepared and tested substantially identically to Example 1 except the formulation detailed in Table 6 was used. Physical testing results are listed in Table 7.

COMPARATIVE EXAMPLE 10

A polyurea polymer was prepared substantially identically to Example 9 except the formulation includes no polyepoxide. Physical testing results are listed in Table 7.

TABLE 6

|  | EXAMPLE 9 | COMPARATIVE EXAMPLE 10* |
|---|---|---|
| POLYISOCYANATE[1] | 165 parts | 165 parts |
| POLYAMINE 1[2] | 60 parts | 60 parts |
| POLYAMINE 2[3] | 36 parts | 36 parts |
| POLYAMINE 3[4] | 50 parts | 50 parts |
| POLYEPOXIDE[5] | 36 parts | 0 parts |
| FILLER[6] | 110 parts | 100 parts |
| SURFACTANT[7] | 0.5 parts | 0.5 parts |
| MOLD RELEASE AGENT[8] | 3.6 parts | 3.6 parts |
| A/B RATIO[9] | 0.78 | 0.66 |

TABLE 6-continued

|  | EXAMPLE 9 | COMPARATIVE EXAMPLE 10* |
|---|---|---|

*Not an example of the present invention.
[1] An MDI polyurethane prepolymer having an isocyanate equivalent weight of about 241.
[2] A polyamine having an approximate equivalent weight of about 1,000 and trifunctionality.
[3] A polyamine having an approximate equivalent weight of about 1,000 an having difunctionality.
[4] Diethyltoluenediamine.
[5] A diglycidyl ether of bisphenol A having a molecular weight of about 340 and difunctionality.
[6] Wollastonite.
[7] A silicon surfactant.
[8] Zinc stearate.
[9] Weight ratio of organic polyisocyanate and polyepoxide to polyamine amine and other components.

TABLE 7

|  | EXAMPLE 9 | COMPARATIVE EXAMPLE 10* |
|---|---|---|
| POLYEPOXIDE CONTENT | 10 percent | 0 percent |
| Specific Gravity g/cc[1] | 1.30 | 1.29 |
| Flex Modulus[2] psi/mPa | 354,600/2,443,194 | 298,200/2,054,598 |
| Heat Sag[3] mm | 2 | 5 |
| Tensile[4] psi/mPa | 6,625/45,646 | 5,585/38,481 |
| Blister Test[5] |  |  |
| 385° F. (196° C.) | PASS | FAIL |
| 400° F. (204° C.) | PASS | FAIL |

*Not an example of the present invention.
[1] ASTM D 792-91 Standard Test Methods for Density and Specific Gravity (Relative Density) of Plastics By Displacement.
[2] ASTM D 790-91 Standard Test Methods for Flexural Properties of Unreinforced and Reinforced Plastics and Electrical Insulating Materials.
[3] ASTM D 648-82 (Reapproved 1988) Standard Test Method for Deflection Temperature of Plastics Under Flexural Load
[4] ASTM D 638-91 Standard Test Method for Tensile Properties of Plastics.
[5] Samples were submerged in ambient temperature water for 10 days, removed from the water and towel dried, and then exposed to 400° F. (205° C.) in an oven for about one hour. A sample which shows any visible blistering fails this test. Samples showing no blisters pass.

EXAMPLE 11

A polyurea polymer was prepared and tested substantially identically to Example 1 except the formulation detailed in Table 8 was used. Physical testing results are listed in Table 9.

COMPARATIVE EXAMPLE 12

A polyurea polymer was prepared substantially identically to Example 11 except the formulation includes no polyepoxide. Physical testing results are listed in Table 9.

TABLE 8

|  | EXAMPLE 11 | COMPARATIVE EXAMPLE 12* |
|---|---|---|
| POLYISOCYANATE[1] | 165 parts | 165 parts |
| POLYAMINE 1[2] | 60 parts | 60 parts |
| POLYAMINE 2[3] | 36 parts | 36 parts |
| POLYAMINE 3[4] | 50 parts | 50 parts |
| POLYEPOXIDE[5] | 36 parts | 0 parts |
| FILLER[6] (MICA) | 110 parts | 110 parts |
| SURFACTANT[7] | 0.5 parts | 0.5 parts |
| MOLD RELEASE | 3.6 parts | 3.6 parts |

TABLE 8-continued

|  | EXAMPLE 11 | COMPARATIVE EXAMPLE 12* |
|---|---|---|
| AGENT[8] |  |  |
| A/B RATIO[9] | 0.77 | 0.66 |

*Not an example of the present invention.
[1] An MDI polyurethane prepolymer having an isocyanate equivalent weight of about 241.
[2] A polyamine having an approximate equivalent weight of about 1,000 and trifunctionality.
[3] A polyamine having an approximate equivalent weight of about 1,000 an having difunctionality.
[4] Diethyltoluenediamine.
[5] A diglycidyl ether of bisphenol A having a molecular weight of about 340 and difunctionality.
[6] Muscovite Mica having a 35–40μ diameter.
[7] A silicon surfactant.
[8] Zinc stearate.
[9] Weight ratio of organic polyisocyanate and polyepoxide to polyamine amine and other components.

TABLE 9

|  | EXAMPLE 11 | COMPARATIVE EXAMPLE 12* |
|---|---|---|
| POLYEPOXIDE CONTENT | 10 percent | 0 percent |
| Flex Modulus[1] psi/mPa | 390,000/2,687,100 | 260,000/1,791,400 |
| Heat Sag[2] mm | 3 | 4 |
| Tensile[3] psi/mPa | 6,500/44,785 | 4,800/33,072 |
| Blister Test[5] |  |  |
| 385° F. (196° C.) | PASS | FAIL |
| 400° F. (204° C.) | PASS | FAIL |

*Not an example of the present invention.
[1] ASTM D 790-91 Standard Test Methods for Flexural Properties of Unreinforced and Reinforced Plastics and Electrical Insulating Materials.
[2] ASTM D 648-82 (Reapproved 1988) Standard Test Method for Deflection Temperature of Plastics Under Flexural Load.
[3] ASTM D 638-91 Standard Test Method for Tensile Properties of Plastics.
[4] Samples were submerged in ambient temperature water for 10 days, removed from the water and towel dried, and then exposed to 400° F. (205° C.) in an oven for about one hour. A sample which shows any visible blistering fails this test. Samples showing no blisters pass.

EXAMPLE 13

A polyurea polymer was prepared substantially identically to Example 1 except that the polymer was not postcured and was analyzed by FTIR spectroscopy. The analysis reveals substantially no oxazolidinone groups present in the polymer.

EXAMPLE 14

A polyurea polymer was prepared substantially identically to Example 1, including postcure. The polymer was analyzed by FTIR spectroscopy. The analysis reveals substantially no oxazolidinone groups or epoxide groups present in the polymer.

What is claimed is:

1. A method for preparing a polyurea polymer comprising admixing a polyurea formulation including a polyisocyanate, a polyepoxide, and a polyamine and heating at a temperature of greater than about 150° C., the method having a first step of admixing the:

(A) polyisocyanate;

(B) polyepoxide; and (C) polyamine;

at a temperature of less than about 130° C. under reaction conditions sufficient to prepare a polyurea polymer, and a second step of postcuring the polyurea polymer at a temperature of greater than about 150° C., wherein the polyisocyanate is selected from the group consisting of toluene diisocyanate (TDI), diphenylmethane diisocyanate (MDI), polymeric MDI (PMDI), polyisocyanates containing carbodiimide groups, uretonimine groups, prepolymers and mixtures thereof; the ratio of isocyanate groups to active hydrogen groups is from about 0.80 to about 1.20; the ratio of epoxide groups to amine groups is from about 0.05 to about 1.50; the admixing is done in a substantial absence of oxazolidinone catalyst and crosslinking materials known as uretidine diones and isocyanurates, and wherein the polymer, after humid aging, upon reheating for an hour at a temperature of 205° C., does not blister.

2. The method of claim 1 wherein the polyamine is an alkylene polyamine, an amine derived from polyoxypropylene diols and/or triols, and mixtures thereof.

3. The method of claim 1 wherein the first step admixing is done by means of a reaction injection molding machine.

4. The method of claim 1 wherein the polyisocyanate and the polyepoxide are combined in one reservoir of the reaction injection molding machine.

5. The method of claim 1 wherein the polyurea polymer is cured during step 2 at from about 150° C. to about 250° C.

6. The method of claim 1 wherein the polyurea polymer is cured during step 2 at from about 165° C. to about 220° C.

7. The method of claim 1 wherein the polyurea polymer is cured during step 2 at from about 190° C. to about 220° C.

8. A polyurea polymer comprising a polymer prepared by the method of claim 1.

9. The polymer of claim 8 wherein the polyisocyanate is a prepolymer containing carbodiimide groups and or urethane groups from diphenylmethane diisocyanate.

10. The polymer of claim 8 wherein the polyamine is an alkylene polyamine, an aromatic polyamine, an amine derived from polyoxypropylene diols and/or triols, and mixtures thereof.

11. The polymer of claim 8 wherein the polyamine is an alkylene polyamine, an amine derived from polyoxypropylene diols and/or triols, and mixtures thereof.

12. The polymer of claim 10 wherein the aromatic polyamine is diethyltoluenediamine or di-tert-butyltoluenediamine.

13. The polymer of claim 8 wherein the polyepoxide is a diglycidyl ether of a cycloaliphatic single ring compound, a diglycidyl ether of a cycloalilphatic two ring compound, a diglycidyl ether of a dihydric single ring compound, a diglycidyl ether of a dihydric bisphenol, a polyglycidyl ether of a hydrocarbon phenolic resin, a polyglycidyl ether of a polyoxyalkylene glycol, a diglycidyl ether of an aliphatic diol, a polyglycidyl ether of a novolac resin or mixtures thereof.

14. The polymer of claim 13 wherein the polyepoxide is a diglycidyl ether of a dihydric bisphenol.

15. The polymer of claim 8 wherein the polymer is a filled polymer.

16. The polymer of claim 15 wherein the polymer is a reinforced polymer.

17. The polymer of claim 8 wherein the polyurea polymer also has polyurethane groups.

18. The method of claim 1 wherein the polyurea composition additionally includes a base polyol, a lower molecular weight active hydrogen containing material or mixtures thereof.

19. The method of claim 18 wherein the polyurea formulation additionally includes blowing agents, fillers, reinforcing substrates, mold release agents, surfactants, chain extenders, ultraviolet light stabilizers, fire retardants or mixtures thereof.

* * * * *